(12) United States Patent
Wells

(10) Patent No.: US 7,904,290 B2
(45) Date of Patent: Mar. 8, 2011

(54) METHOD AND APPARATUS FOR ENHANCED TRANSLATION IN AN APPLICATION SIMULATION DEVELOPMENT ENVIRONMENT

(75) Inventor: Bradley K. Wells, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 1321 days.

(21) Appl. No.: 11/015,170

(22) Filed: Dec. 17, 2004

(65) Prior Publication Data

US 2006/0136192 A1 Jun. 22, 2006

(51) Int. Cl.
*G06F 17/28* (2006.01)

(52) U.S. Cl. .................. 704/2; 704/3; 715/203; 715/204

(58) Field of Classification Search .................. 704/2, 3; 715/203, 204
See application file for complete search history.

(56) References Cited

U.S. PATENT DOCUMENTS

| | | | | |
|---|---|---|---|---|
| 5,091,876 | A * | 2/1992 | Kumano et al. | 704/3 |
| 5,243,519 | A * | 9/1993 | Andrews et al. | 704/8 |
| 5,499,335 | A | 3/1996 | Silver et al. | |
| 5,551,055 | A * | 8/1996 | Matheny et al. | 710/62 |
| 5,583,761 | A * | 12/1996 | Chou | 715/201 |
| 5,664,206 | A | 9/1997 | Murow et al. | |
| 5,675,818 | A * | 10/1997 | Kennedy | 704/8 |
| 5,745,738 | A | 4/1998 | Ricard | |
| 5,797,011 | A | 8/1998 | Kroll et al. | |
| 5,974,372 | A * | 10/1999 | Barnes et al. | 704/8 |
| 6,128,629 | A * | 10/2000 | Bretschneider et al. | 707/203 |
| 6,311,151 | B1 * | 10/2001 | Yamamoto et al. | 704/8 |
| 6,311,180 | B1 * | 10/2001 | Fogarty | 707/4 |
| 6,345,244 | B1 * | 2/2002 | Clark | 704/2 |
| 6,687,736 | B1 * | 2/2004 | Lee | 709/203 |
| 6,774,920 | B1 * | 8/2004 | Cragun | 715/730 |
| 6,943,752 | B2 * | 9/2005 | Masumoto et al. | 345/1.1 |
| 7,398,214 | B2 * | 7/2008 | Boegelund et al. | 704/277 |
| 2002/0091510 | A1 | 7/2002 | Forrest et al. | |
| 2003/0009323 | A1 * | 1/2003 | Adeli | 704/8 |
| 2003/0065640 | A1 * | 4/2003 | Ough et al. | 707/1 |
| 2003/0086682 | A1 * | 5/2003 | Schofield et al. | 386/46 |
| 2003/0101043 | A1 * | 5/2003 | Boegelund et al. | 704/3 |
| 2003/0144998 | A1 * | 7/2003 | Bennett et al. | 707/3 |
| 2003/0152904 | A1 | 8/2003 | Doty, Jr. | |
| 2003/0219707 | A1 | 11/2003 | Hopkins et al. | |
| 2004/0205041 | A1 * | 10/2004 | Erol et al. | 707/1 |
| 2006/0075348 | A1 * | 4/2006 | Xu et al. | 715/730 |

* cited by examiner

OTHER PUBLICATIONS

Suzanne Little, Jane Hunter. (2002), A Tool for Creating, Editing and Tracking Virtual SMIL Presentations, World Conference on Educational Multimedia, Hypermedia & Telecommunications, Denver, Colorado USA.*

*Primary Examiner* — Richemond Dorvil
*Assistant Examiner* — Greg A Borsetti
(74) *Attorney, Agent, or Firm* — Scully, Scott, Murphy & Presser, P.C.; William E. Schiesser

(57) ABSTRACT

Disclosed are a method, a system and a computer program for translating an application simulation into a plurality of languages. The method comprises the steps of creating a first simulation having a sequence of frames, in a first language; adding elements in said first language to said sequence of frames; and creating a second simulation having a sequence of frames in a second language. The method comprises the further steps of exporting said elements including frame sequence number, position of each of said elements, and settings to a document; translating said elements in said document into said second language; and automatically placing the translated elements on said frames of said second simulation, using said sequence numbers, said position, and said settings.

24 Claims, 3 Drawing Sheets

FIG. 4
HIDDEN TABLE _76_
| ELEMENT | SCREEN NUMBER | ELEMENTS DATA | XML REPRESENTATION |
|---|---|---|---|
|  |  |  |  |
|  |  |  |  |
|  |  |  |  |
FIG. 5
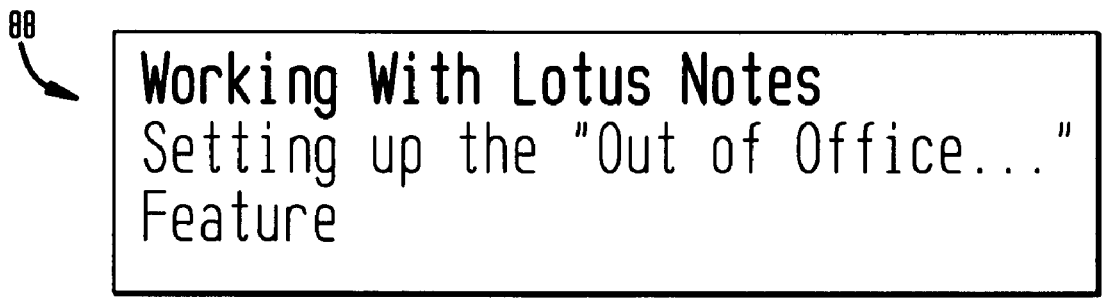
Working With Lotus Notes
Setting up the "Out of Office..."
Feature
FIG. 6
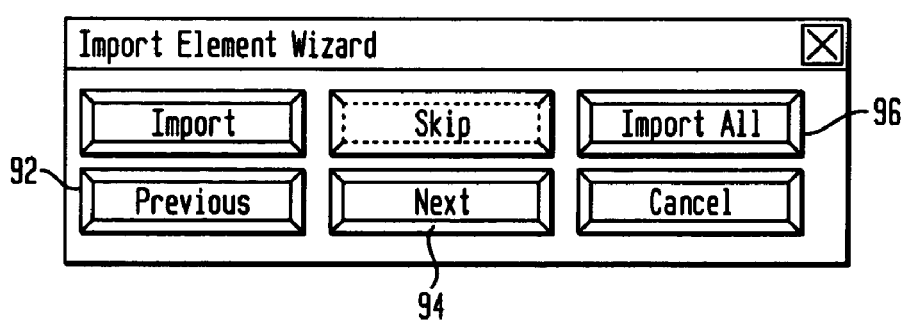

METHOD AND APPARATUS FOR ENHANCED TRANSLATION IN AN APPLICATION SIMULATION DEVELOPMENT ENVIRONMENT

BACKGROUND OF THE INVENTION

1. Field of the Invention

This invention generally relates to computer application simulations, and more specifically, the invention relates to a method, system and computer software program for translating computer application simulations into a plurality of languages.

2. Background Art

Simulations are produced in the software industry for product tutorials and marketing presentations. These simulations are useful for demonstrating a product and teaching how to use specific features in a product. Currently, software simulations are developed with labor-intensive techniques. One production technique uses a video camera to film screen images produced as an experienced user physically steps through a software procedure. After filming the entire procedure, the video tape may be edited to add captions and/or a sound narrative.

The edited video tape of the simulation is typically digitized into an animation format file that is distributed to prospective users of the product, or included with the software product to teach new users about and how to use the software product. When included with the software product, the animation is often accessed as a tutorial option under a Help menu topic. The animation file can be distributed alone or as part of a software product on various digital media such as floppy disks or CD-ROMs, and can be transmitted over networks, as is often done when used as part of a "demo" of a product.

Another way for simulations to be created, and this is quite common in the market today, is to have an application that runs in the background and monitors an experienced user's interactions with the software being simulated. Those interactions are saved as a combination of ASCII script files and as the digital images of the screen changes.

Another common simulation production technique is to create a separate software program that simulates a particular software product. In this case, the separate software program automatically steps through an entire procedure of the software product to be simulated. This separate software simulation program could be written in the language "C" or some other suitable high-level language. However, significant technical expertise is required to author a separate software simulation program, and changes to the program can only be made by a highly skilled computer programmer.

A significant problem in the creation of a tutorial simulation arises in connection with producing simulations for software products distributed in foreign countries. When software is sold internationally, simulations must be produced not only for English language customers, but for different foreign language customers as well. Previous methods require filming a separate tutorial in each foreign language such as German, French, Italian, and Spanish, in which the product will be marketed. Consequently, considerable costs are incurred when a simulation is produced that will be associated with a software product intended for international distribution.

For example, one type of application simulation development process involves a content developer taking a capture, or a series of screen images, of an application and then adding text to the simulation to provide instruction, direction, and feedback. Obviously, the application is in a specific language and the added text is most often in the same language.

Often times an application simulation scenario is to be delivered not only with the added text in different languages, but also with the actual capture (i.e. the screen images) in different languages. For example, an application may have the options on file menu, dialog text, and messages in multiple languages. To deliver simulations of the multi-application, two completely different captures must be made and the text elements added to each with the text in different languages.

One typical process for delivering simulations of multi-language applications is as follows:
1) Capture the application in language X,
2) Add text elements,
3) Capture the application in language Y,
4) Manually copy all elements, but especially the text elements, from the capture in language X to the capture in language Y,
5) Export the text elements from the capture in language Y to a form that can be translated, and
6) Import the translated text, now in language Y, into the capture in language Y.

Steps 3) through 6) have to be repeated for every additional language to be supported. Step 4), where a content developer has to go through the simulation screen by screen and copy elements from one capture to another, is extremely time consuming. Elimination of this step in the process would be highly desirable.

SUMMARY OF THE INVENTION

An object of this invention is to provide an improved method and system for translating a computer application simulation into a plurality of languages.

Another object of the present invention is to improve procedures for translating application simulations into a plurality of languages by eliminating the manual copying of the elements between captures in different languages.

These and other objectives are attained with a method, system and computer program for translating an application simulation into a plurality of languages. The method comprises the steps of creating a first simulation having a sequence of frames, in a first language; adding elements in said first language to said sequence of frames; and creating a second simulation having a sequence of frames in a second language. The method comprises the further steps of exporting said elements including frame sequence number, position of each of said elements, and settings to a document; translating said elements in said document into said second language; and automatically placing the translated elements on said frames of said second simulation, using said sequence numbers, said position, and said settings.

With the preferred embodiment of the invention, in order to eliminate the manual copying of the elements between captures in different languages, the elements themselves are also exported to the document for translation. All of the information needed to place the element within the new capture is saved as hidden text within the translation document. When the translated text is being imported into the capture, the elements are placed on the appropriate screens and the translated text inserted in them.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 4 illustrates a table that may be used in the translation process of this invention.

FIG. 5 shows a screen element that the invention may be used to translate.

FIG. 6 depicts a wizard that may be used in the implementation of the present invention.

DETAILED DESCRIPTION OF THE PREFERRED EMBODIMENTS

The present invention relates to computer software simulations. One way to create such a simulation is for an author (or simulation creator) to produce a simulation by composing a script. These commands may be interpreted to produce a plurality of images in the form of Device Independent Bitmaps (DIBs). The DIBs may be converted by a third party software program into an animation format file which is suitable for viewing when a user of the software program runs the simulation. This may be done, for example, by selecting a tutorial from the Help menu of the software program that demonstrates a procedure or by running a demonstration that illustrates the procedure being implemented by the software program.

Another way for simulations to be created is to have an application that runs in the background and monitors an experienced user's interactions with the software being simulated. Those interactions are saved as a combination of ASCII script files and as the digital images of the screen changes. With the use of the monitoring software, the scripts are automatically created for the author, or simulation creator.

The text commands entered for scripting a simulation can be thought of as an orchestration of events, actions, and behavior of objects within a software program, and are analogous to the stage directions and lines of a script for a theatrical play. The simulation script commands make reference to media objects that are part of the software program in which a procedure is being simulated and control the action of one or more of the media objects as programmed by the script author. The author composes a text file containing script commands that hide an operating system's low level implementation details and generate machine instructions that are readable by the software program and by the operating system and cause a plurality of the DIB images to be produced in sequence that illustrate the procedure in the software program that is being simulated.

The conversion of the images into an animation file produces a file in a form such as an Audio Visual Interleaved (AVI) format, which can be run by an appropriate player. The player file(s) may be provided with the operating system or included on a floppy disk or CD-ROM on which a demo of the software product is distributed.

Figure 1:
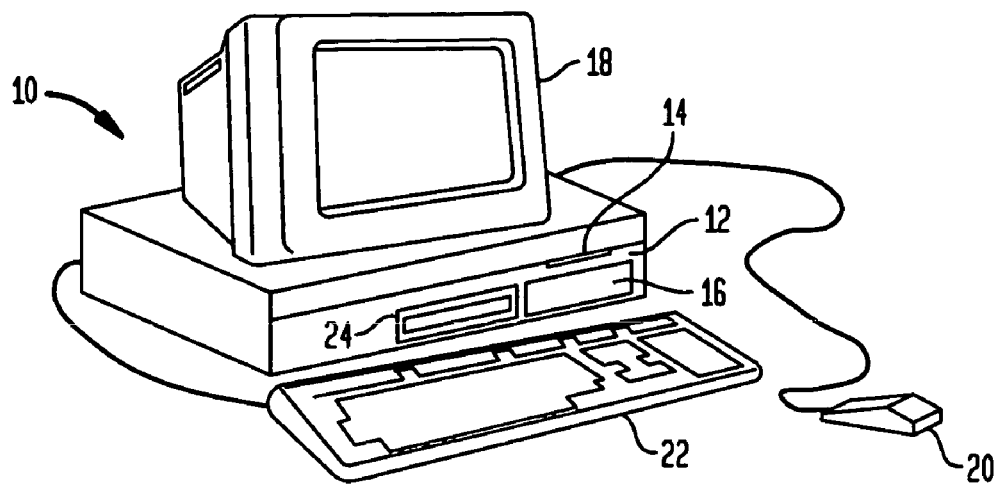
FIG. 1 is a schematic block diagram showing a personal computer suitable for use in implementing the present invention.

With reference to FIG. 1, a personal computer 10 is illustrated as an example of the type of computer suitable for use in connection with creating a simulation in accord with the present invention. Although the personal computer illustrated uses a Microsoft Corporation operating system, such as Windows 95™, it is contemplated that other types of personal computers, such as those made by Apple Computer Corporation, will also be usable in implementing the present invention. Personal computer 10 includes a processor chassis 12 in which is mounted a floppy disk drive 14, which is suitable for reading and writing data from and to a floppy disk (not shown), and a hard drive 16 suitable for nonvolatile storage of data and executable programs. A monitor 18 is included for displaying graphics and text produced when an executable program is being run on the personal computer.

Input can be provided to personal computer 10 using either a mouse 20 for manipulating a cursor (not shown) on monitor 18, which is used for selecting menu items and graphic controls displayed on the monitor by pressing an appropriate selection button (not shown) on the mouse, or by input entered by the user on a keyboard 22. Optionally, processor chassis 12 includes a CD-ROM drive 24, which is suitable for reading programs and data from a CD-ROM.

Figure 2:
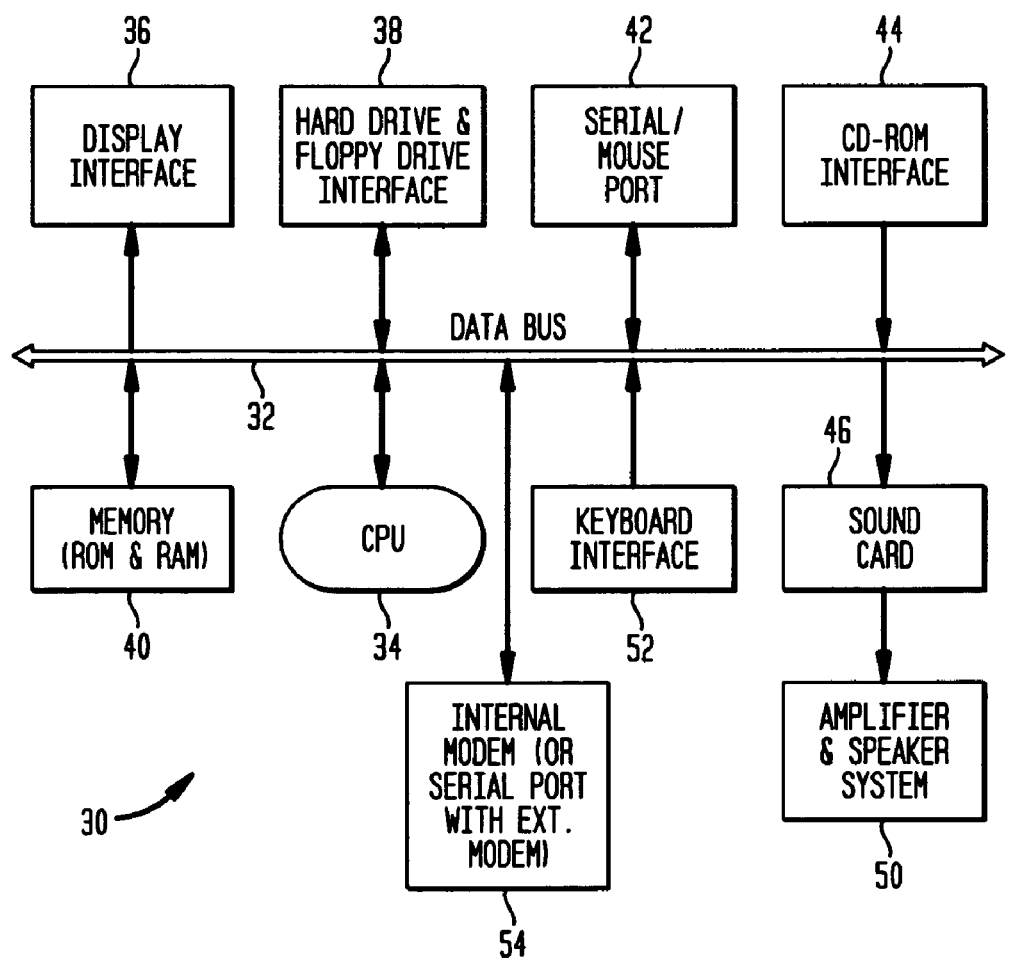
FIG. 2 is a block diagram illustrating components of the personal computer of FIG. 1 that are included within its processor chassis.

FIG. 2 shows a block diagram 30 in which components housed within processor chassis 12 are illustrated. A motherboard (not shown) includes a data bus 32, which provides bi-directional communication between these components and a central processing unit (CPU) 34. The components include a display interface 36, which drives monitor 18, providing the video signals necessary to produce a graphic display during the chat session and when running other executable programs running on the personal computer. A hard drive and floppy drive interface 39 provides bi-directional communication between floppy drive 14 and hard drive 16, and data bus 32, enabling data and machine instructions comprising executable programs to be stored and later read into a memory 40. Memory 40 includes both a read only memory (ROM) and random access memory (RAM). The ROM is used for storing a basic input/output operating system (BIOS) used in booting up personal computer 10 and other instructions essential for its operation. Machine instructions comprising executable programs are loaded into the RAM via data bus 32 to control CPU 34.

A serial/mouse port 42 provides an interface for mouse 20 to data bus 32 so that signals indicative of movement of the mouse and actuation of the buttons on the mouse are input to CPU 34. An optional CD-ROM interface 44 couples optional CD-ROM drive 24 to data bus 32 and may comprise a small computer system interface (SCSI) or other appropriate type of interface designed to respond to the signals output from CD-ROM drive 24. Optionally, a sound card 46 is connected to data bus 32 and its output is coupled to an amplifier and speaker system 50 to provide a sound capability for personal computer 10. Output signals from keyboard 22 are connected to a keyboard interface 52, which conveys the signals from the keyboard to data bus 32. If no external modem is used, an internal modem 54 can be coupled directly to data bus 32. Alternatively, an external modem (not shown) can be connected to the data bus through a serial port of personal computer 10.

The production of a software simulation is, generally speaking, a straightforward process. The author composes a script or text file of commands that will be followed to simulate the desired procedure in a software program. This text file can be created using a text line editor or a word processing program, which is capable of storing a plain text file containing the commands on hard drive 16.

Figure 3:
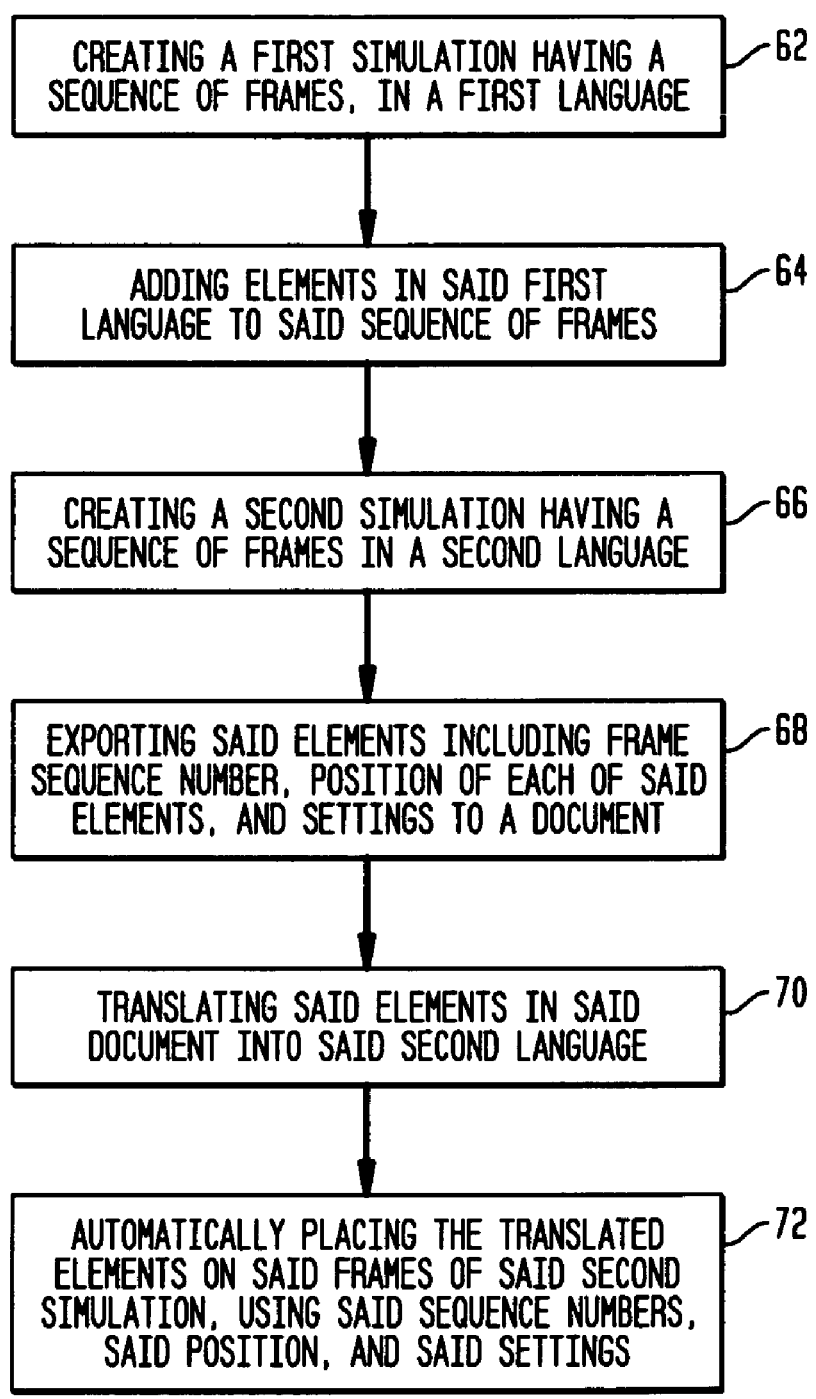
FIG. 3 is a flow chart showing a preferred procedure for implementing the present invention.

As previously mentioned, simulations are often provided in different languages. The present invention provides an enhanced translation in an application simulation development environment. FIG. 3 shows one method 60 that may be used to do this. In this method, at step 62, a first simulation is created having a sequence of frames, in a first language; and at step 64, elements in said first language are added to said sequence of frames. At step 66, a second simulation having a sequence of frames in a second language is created; and at step 68, said elements including frame sequence number, position of each of said elements, and settings are exported to a document. Step 70 is to translate said elements in said document into said second language; and step 72 is to automatically place the translated elements on said frames of said second simulation, using said sequence numbers, said position, and said settings.

In the preferred embodiment of the invention, in order to eliminate the manual copying of the elements between captures in different languages, the elements themselves are also exported to the document for translation. All of the information needed to place the element within the new capture is saved as hidden text within the translation document. When the translated text is being imported into the capture, the elements are placed on the appropriate screens and the translated text inserted in them.

The process works by creating a hidden table inside the translation document. FIG. 4 represents an example of such a table 76. A row 78 is created for each element 80 that contains the screen number 82 and the elements data 84. For the elements to be able to be exported to a document, however, the element must be able to be presented in a form that the document can understand, namely textual. In this case, each element has the ability to represent itself in XML 86. For example, the screen element shown in FIG. 5 at 88 is represented by the following XML:

simulations that are different by a few screens. In this situation, blindly importing the elements from the translation document into the capture would result again in a situation where elements would need to be copied, this time within the same simulation. To address this issue, an application aide, or a wizard, may be used. An implementation of an import wizard might be, for example, as shown in FIG. 6 at 90.

This wizard 90 may be used to allow a developer to examine a screen with the imported elements on it before committing the element permanently. The developer has the option of adding the elements to the current screen. By using buttons 92, 94 and 96, the developer also has the option of viewing the elements on either the previous or next screens, or importing all the elements automatically, without previewing each one.

In order to automate the process as fully as possible, the import wizard preferably retains information concerning previous placements of elements and adjusts the preview of future elements accordingly. For example, if the capture into which the elements are being imported has an extra screen, the developer would have to press the "Next" button 96 to preview the element on, and then move them to, that screen. The wizard now keeps track of the fact that the simulations are off by one screen. This shift is taken into account in both the future preview elements on screens and in their placement.

As indicated hereinabove, it should be understood that the present invention can be realized in hardware, software, or a combination of hardware and software. Any kind of computer/server system(s)—or other apparatus adapted for carrying out the methods described herein—is suited. A typical

```
<ta x="154" y= "66"dx="370" dy="112">
    <text><b><s=26> Working With Lotus Notes\n</b> Setting up the "Out of Office..."
\nFeature</text>
    <fs>14</fs>
    <sselem>
        <poly>
            <bgm>0</bgm>
<pts>8.00,1.00,1040;1.00,1.00;1.00,8.00,880;8.00,8.00,990;8.00,8.00,330;8.00,8.00,1260</pts>
        </poly>
    </sselem>
    <selem>
        <poly>
            <bgm><0>/bgm>
            <pts>0.00,0.00;1.00,0.00;1.00,1.00;0.00,1.00;0.00,0.00</pts>
            <bpts>1.00,1.00;-1.00,1.00;-1.00,-1.00;1.00,-1.00;1.00,1.00</bpts>
        <poly>
    <selem>
    <bselem>
        <poly>
            <bgm>0</bgm>
            <pts>0.00,0.00;1.00,0.00;1.00,1.00;0.00,1.00;1.00;0.00,0.00</pts>
            <bpts>1.00,1.00;-1.00,1.00;-1.00,-1.00;1.00,1.00;-1.00;1.00,1.00</bpts>
        <poly>
    </bselem>
    <tarea x= "0.02" y="0.02" dx="0.98" dy= "0.98"></tarea>
    <pbm>2</pbm>
    <id>118</id>
    <layer>1</layer>
</ta>
```

In addition to the XML representation of an element, the screen number from which it came in the original capture is also saved. This information may be used to automate the importing of the translated elements as much as possible.

With the export and importing of the XML representation of elements to the saved screen numbers, the step of manually copying of elements between simulation is removed. However, it is unlikely that the two captures in the two different languages are going to be exactly the same. An extra event or a mistake by the simulation developer could lead to two combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of translating an application simulation into a plurality of languages, comprising the steps of:
   executing a software simulation program on a computer to create, a first simulation having a first sequence of a multitude of frames, in a first language;
   adding elements in said first language to said sequence of frames;
   creating a second simulation having a second sequence of a multitude of frames in a second language, wherein the first and second sequences are different;
   exporting said elements including frame sequence number, position of each of said elements, and settings to a document;
   translating said elements in said document into said second language; and
   automatically placing the translated elements on said frames of said second simulation, using said sequence numbers, said position, and said settings, including using a wizard to retain information about placement of the translated elements on the frames in the second sequence, wherein each of the elements has a counterpart translation, each of the counterpart translations is put on one of the frames of the second sequence, and
   the step of using the wizard includes using the wizard to determine, for each of at least some of the counterpart translations, the one of the multitude of frames in the second sequence on which to put said each counterpart translation to ensure that said translated elements are placed on the correct frames of said second simulation; and wherein:
   during the step of placing the translated elements on said frames of said second simulation, the frames of the second sequence became shifted, relative to the frames of the first sequence, by a given number; and
   the step of using the wizard further includes using the wizard to keep track of said given number, and to use said given number to determine the one of the multitude of frames in the second sequence on which to put said each counterpart translation.

2. A method according to claim 1, wherein the step of exporting said elements includes the steps of:
   creating a table in said document; and
   placing in said table said exported elements.

3. A method according to claim 2, wherein the placing step includes the step of placing in said table additional data associated with said exported elements.

4. A method according to claim 3, wherein said additional data includes said frame sequence numbers, said positions, and said settings.

5. A method according to claim 2, wherein said exported elements are stored in said table in a text format.

6. A method according to claim 1, wherein the step of using said wizard includes the step of using said wizard to adjust said frame sequence numbers in said table.

7. The method according to claim 1, wherein:
   each of the elements is on one of the frames of the first sequence, said one of the frames of the first sequence having a numbered position in the first sequence;
   said one of the frames of the second sequence has a numbered position in the second sequence;
   for at least some of the elements, the number of the position of the frame in the first sequence that the element is on, is different than the number of the position of the frame in the second sequence that the counterpart translation of the element is on; and
   the step of using the wizard includes, for each of said at least some of the elements, using the wizard to determine the number of the position of the one of the frames in the second sequence on which the counterpart translation of said each element is put.

8. A computer system for translating an application simulation into a plurality of languages, comprising:
   a computer, including a software simulation program, for creating a first simulation having a first sequence of a multitude of frames, in a first language;
   means for adding elements in said first language to said first sequence of frames;
   means for creating a second simulation having a second sequence of a multitude of frames in a second language, wherein the first and second sequences are different;
   means for exporting said elements including frame sequence number, position of each of said elements, and settings to a document;
   means for translating said elements in said document into said second language; and
   means for automatically placing the translated elements on said frames of said second simulation, using said sequence numbers, said position, and said settings, said automatically placing including using a wizard to retain information about placement of the translated elements on the frames in the second sequence, wherein each of the elements has a counterpart translation, each of the counterpart translations is put on one of the frames of the second sequence, and
   the using the wizard includes using the wizard to determine, for each of at least some of the counterpart translations, the one of the multitude of frames in the second sequence on which to put said each counterpart translation is put to ensure that said translated elements are placed on the correct frames of said second simulation; and wherein:
   during the placing of the translated elements on said frames of said second simulation, the frames of the second sequence became shifted, relative to the frames of the first sequence, by a given number; and
   the using the wizard further includes using the wizard to keep track of said given number, and to use said given number to determine the one of the multitude of frames in the second sequence on which to put said each counterpart translation.

9. A system according to claim 8, wherein the means for exporting said elements includes:
   means for creating a table in said document; and
   means for placing in said table said exported elements.

10. A system according to claim 9, wherein the placing means includes means for placing in said table additional data associated with said exported elements.

11. A system according to claim 10, wherein said additional data includes said frame sequence numbers, said positions, and said settings.

12. A system according to claim 11, wherein said exported elements are stored in said table in a text format.

13. A program storage device readable by machine, tangibly embodying a program of instructions executable by the machine to perform method steps for translating an application simulation into a plurality of languages, said method steps comprising:
 creating a first simulation having a first sequence of a multitude of frames, in a first language;
 adding elements in said first language to said sequence of frames;
 creating a second simulation having a second sequence of a multitude of frames in a second language, wherein the first and second sequences are different;
 exporting said elements including frame sequence number, position of each of said elements, and settings to a document;
 translating said elements in said document into said second language; and
 automatically placing the translated elements on said frames of said second simulation, using said sequence numbers, said position, and said settings, including using a wizard to retain information about placement of the translated elements on the frames in the second sequence, wherein each of the elements has a counterpart translation, each of the counterpart translations is put on one of the frames of the second sequence, and the step of using the wizard includes using the wizard to determine, for each of at least some of the counterpart translations, the one of the multitude of frames in the second sequence on which to put said each counterpart translation to ensure that said translated elements are placed on the correct frames of said second simulation; and wherein:
 during the step of placing the translated elements on said frames of said second simulation, the frames of the second sequence became shifted, relative to the frames of the first sequence, by a given number; and
 the step of using the wizard further includes using the wizard to keep track of said given number, and to use said given number to determine the one of the multitude of frames in the second sequence on which to put said each counterpart translation.

14. A program storage device according to claim 13, wherein the step of exporting said elements includes the steps of:
 creating a table in said document; and
 placing in said table said exported elements.

15. A program storage device according to claim 14, wherein the placing step includes the step of placing in said table additional data associated with said exported elements.

16. A program storage device according to claim 15, wherein said additional data includes said frame sequence numbers, said positions, and said settings.

17. A program storage device according to claim 14, wherein said exported elements are stored in said table in a text format.

18. A program storage device according to claim 14, wherein:
 the step of using said wizard includes the step of using said wizard to adjust said frame sequence numbers in said table.

19. A method of deploying a computer program product for translating an application simulation into a plurality of languages, comprising the steps of:
 deploying the computer program product in a computer, wherein, when the computer program product is executed in the computer, the computer translates an application simulation from a first language to a second language by:
 creating a first simulation having a first sequence of a multitude of frames, in a first language;
 adding elements in said first language to said sequence of frames;
 creating a second simulation having a second sequence of a multitude of frames in a second language;
 exporting said elements including frame sequence number, position of each of said elements, and settings to a document;
 translating said elements in said document into said second language; and
 automatically placing the translated elements on said frames of said second simulation, using said sequence numbers, said position, and said settings, including using a wizard to retain information about placement of the translated elements on the frames in the second sequence, wherein each of the elements has a counterpart translation, each of the counterpart translations is put on one of the frames of the second sequence, and
 the step of using the wizard includes using the wizard to determine, for each of at least some of the counterpart translations, the one of the multitude of frames in the second sequence on which to put said each counterpart translation to ensure that said translated elements are placed on the correct frames of said second simulation; and wherein:
 during the step of placing the translated elements on said frames of said second simulation, the frames of the second sequence became shifted, relative to the frames of the first sequence, by a given number; and
 the step of using the wizard further includes using the wizard to keep track of said given number, and to use said given number to determine the one of the multitude of frames in the second sequence on which to put said each counterpart translation.

20. A method according to claim 19, wherein the step of deporting exporting said elements includes the steps of:
 creating a table in said document; and
 placing in said table said exported elements.

21. A method according to claim 20, wherein the placing step includes the step of placing in said table additional data associated with said exported elements.

22. A method according to claim 21, wherein said additional data includes said frame sequence numbers, said positions, and said settings.

23. A method according to claim 20, wherein said exported elements are stored in said table in a text format.

24. A method according to claim 20, wherein:
 the step of using said wizard includes the step of using said wizard to adjust said frame sequence numbers in said table.

* * * * *